(12) United States Patent
Konishi et al.

(10) Patent No.: US 7,910,147 B2
(45) Date of Patent: Mar. 22, 2011

(54) PREPARATION PROCESS OF GREEN TEA EXTRACT

(75) Inventors: Tomoko Konishi, Sumida-ku (JP); Koichi Funada, Sumida-ku (JP)

(73) Assignee: Kao Corporation, Tokyo (JP)

( * ) Notice: Subject to any disclaimer, the term of this patent is extended or adjusted under 35 U.S.C. 154(b) by 1108 days.

(21) Appl. No.: 11/513,304

(22) Filed: Aug. 31, 2006

(65) Prior Publication Data

US 2007/0048430 A1    Mar. 1, 2007

(30) Foreign Application Priority Data

Sep. 1, 2005  (JP) .................................. 2005-253300

(51) Int. Cl.
A23F 3/00        (2006.01)
(52) U.S. Cl. ...................... 426/435; 426/597; 426/330.3
(58) Field of Classification Search .................. 426/597, 426/435, 330.3
See application file for complete search history.

(56) References Cited

U.S. PATENT DOCUMENTS

| | | | | |
|---|---|---|---|---|
| 3,812,266 A | * | 5/1974 | Sanderson et al. ............... | 426/52 |
| 3,821,440 A | * | 6/1974 | Reeve ............................ | 426/312 |
| 4,613,672 A | | 9/1986 | Hara | |
| 5,250,317 A | * | 10/1993 | Liu et al. ........................ | 426/597 |
| 5,427,806 A | * | 6/1995 | Ekanayake et al. ......... | 426/330.3 |
| 6,036,991 A | | 3/2000 | Humphrey et al. | |
| 7,220,444 B2 | * | 5/2007 | Ogura et al. ................... | 426/597 |
| 7,232,585 B2 | * | 6/2007 | Quan et al. ..................... | 426/597 |

FOREIGN PATENT DOCUMENTS

| | | | |
|---|---|---|---|
| JP | 47-5294 | | 3/1972 |
| JP | 52-39476 | | 3/1977 |
| JP | 60-13780 | | 1/1985 |
| JP | 60-156614 | | 8/1985 |
| JP | 3-108444 | | 5/1991 |
| JP | 8-9883 | | 1/1996 |
| JP | 08066156 | * | 3/1996 |
| JP | 2001-504704 | | 4/2001 |
| JP | 2003-259806 | | 9/2003 |
| JP | 2003-259807 | | 9/2003 |
| JP | 2005204527 | * | 8/2005 |

OTHER PUBLICATIONS

U.S. Appl. No. 12/183,675, filed Jul. 31, 2008, Iwasaki, et al.
U.S. Appl. No. 12/183,707, filed Jul. 31, 2008, Iwasaki, et al.
Office Action issued Sep. 14, 2010, in Japanese Patent Application No. 2006-231521, filed Aug. 29, 2006 (w/English Translation).

* cited by examiner

*Primary Examiner* — Anthony Weier
(74) *Attorney, Agent, or Firm* — Oblon, Spivak, McClelland, Maier & Neustadt, L.L.P.

(57) ABSTRACT

An object is to provide a preparation process of a green tea extract having a high non-polymer catechin concentration and tasting good with less bitterness and less astringency. The present invention relates to a preparation process of a green tea extract, which comprises subjecting an enzyme-inactivated raw tea leaves to CTC processing, drying the tea leaves until the water content thereof becomes 20 wt. % or less, and extracting the tea leaves while setting the weight ratio of an extraction solvent to the tea leaves to be extracted to 30 or less.

8 Claims, 1 Drawing Sheet

PREPARATION PROCESS OF GREEN TEA EXTRACT

TECHNICAL FIELD

The present invention relates to a preparation process of a green tea extract which contains a non-polymer catechin at a high concentration and tastes good with less bitterness and less astringency.

BACKGROUND OF THE INVENTION

Non-polymer catechins were reported to have an effect of suppressing an increase in cholesterol level (refer to Patent Document 1, for example). In order to obtain such a physiological effect, an adult is required to drink four to five cups of tea a day. Therefore, there has been a growing demand for the development of a technology capable of incorporating non-polymer catechins at a high concentration in beverages in order to facilitate the ingestion of a large amount of non-polymer catechins.

For the incorporation of non-polymer catechins at a high concentration in a green tea beverage, there is a method of extracting a large amount of catechins from green tea leaves. It is also possible to add non-polymer catechins to a beverage in the dissolved form by making use of a concentrate of a green tea extract (refer to Patent Document 2, for example).

The method of extracting a large amount of catechins from green tea leaves, however, has the problem that the bitterness and astringency emanated from green tea leaves are prone to become stronger if the extract is prepared at a high concentration.

The bitterness and astringency emanated from green tea leaves are thought to stem mainly from non-polymer catechins. It is known that among non-polymer catechins, catechins in the free form taste less astringent but bitter; catechins in the ester form taste both bitter and astringent; and the bitterness and astringency of catechins in the ester form are stronger than those of catechins in the free form.

For improving the extraction efficiency of a green tea component, methods of pulverizing tea leaves and then extracting them are known (Patent Documents 3 to 5).

However, none of the green tea extracts obtained by the above-described method, which contains non-polymer catechins at a high concentration, are still not satisfactory when used as a beverage to be taken for a long term.

[Patent Document 1] JP-A-S60-156614
[Patent Document 2] JP-A-S60-13780
[Patent Document 3] JP-A-S47-5294
[Patent Document 4] JP-A-S52-39476
[Patent Document 5] JP-A-H03-108444

[Disclosure of the Invention]

In the invention, there is thus provided a preparation process of a green tea extract, which comprises subjecting enzyme-inactivated raw tea leaves to CTC processing, drying them until their water content becomes 20 wt. % or less, and then extracting the resulting tea leaves under the condition that the weight ratio of an extraction solvent to the tea leaves to be extracted is 30 or less.

LEGENDS

Figure 1:
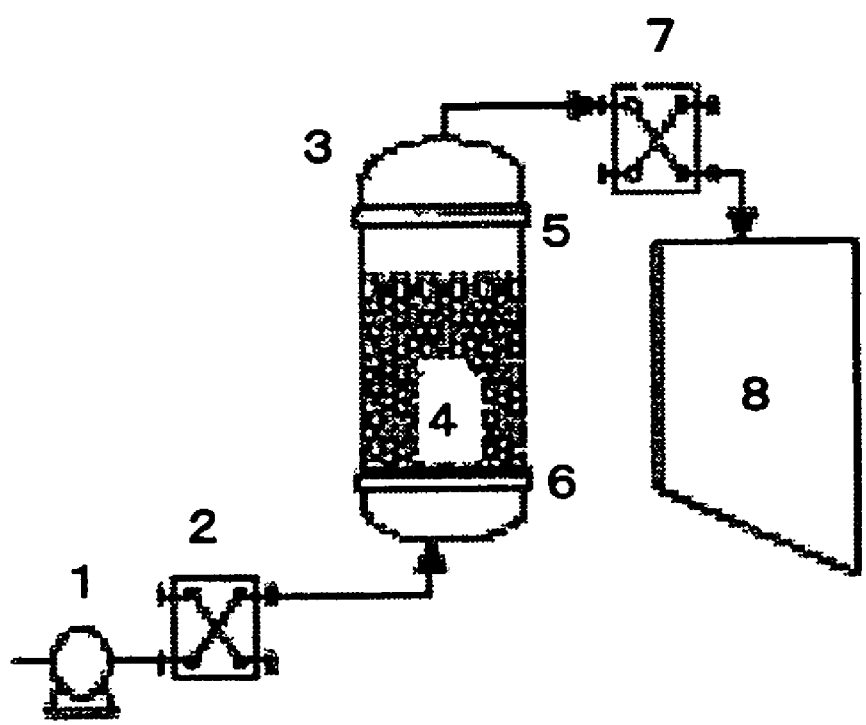
FIG. 1 is a schematic view illustrating an extraction method using a closed column extractor according to the present invention.

1. Pump
2. Exchanger for heating ion exchange water
3. Closed extraction column
4. Tea leaves
5. Tea leaves retainer plate (upper)
6. Tea leaves retainer plate (lower)
7. Heat exchanger for cooling an extract
8. Extract recovery tank

DETAILED DESCRIPTION OF THE INVENTION

An object of the present invention is to provide a preparation process of a green tea extract having a high catechin content and tasting good with less bitterness and less astringency.

The present inventors have carried out various investigations with a view to achieving both efficient extraction of catechins from green tea and reduction of bitterness and astringency. As a result, it has been found that a green tea extract having a high non-polymer catechin content and tasting good with less bitterness and less astringency is obtainable by subjecting enzyme-inactivated raw tea leaves not to ordinary pulverization treatment but to CTC processing, drying the resulting green tea leaves until they have a predetermined water content, and then extracting them with a predetermined amount of an extraction solvent.

The present invention makes it possible to provide a green tea extract having, in the solid content thereof, non-polymer catechins at a concentration as high as from 20 to 40 wt. %; having, in the non-polymer catechins, a gallate content (gallate percentage) of from 40 to 60 wt. %; and tasting good with less bitterness and less astringency. Such a green tea extract is useful for a packaged beverage containing a high concentration of non-polymer catechins.

The term "non-polymer catechin" as used herein is a generic term, which collectively encompasses non-epicatechins such as catechin, gallocatechin, catechin gallate and gallocatechin gallate, and epicatechins such as epicatechin, epigallocatechin, epicatechin gallate and epigallocatechin gallate.

Examples of raw tea leaves to be used in the present invention include tea leaves available from the Genus *Camellia*, for example, *C. sinensis* and *C. assamica*, and the Yabukita variety, or hybrids thereof. These raw tea leaves are subjected to enzyme inactivation treatment in order to prevent their fermentation. Enzyme inactivation treatment is, for example, steaming treatment, hot water dipping, and pan firing treatment. Of these, steaming treatment and hot water dipping are preferred, because pan firing treatment causes a change in taste due to thermal history. The steaming treatment or hot water dipping is performed preferably at from 90 to 120° C. for from 10 seconds to 3 minutes, while pan firing treatment is performed preferably at from 300 to 400° C. for from 5 to 20 minutes. Examples of such enzyme-inactivated tea leaves include sen-cha, gyokuro and ten-cha. (Nihoncha Instructor Koza I, produced and edited by NPO Nihoncha Instructor Association, published by NPO Nihoncha Instructor Association, 2004; Nihoncha Zensho, written by Yasumoto Fuchinoue•Hiroko Fuchinoue, published by Rural Culture Association, 1999)

In the present invention, raw tea leaves after inactivation of an enzyme contained therein are subjected to CTC processing. The term "CTC processing" as used herein means processing ordinarily used for black tea in which crushing, tearing and curling are performed at once by using a CTC processing apparatus.

In the CTC processing apparatus, tea leaves pass through a space between two rollers made of stainless and are processed therebetween by making use of a difference in the rotation speed between these rollers, that is, 700 rpm and 70 rpm. These tea leaves get caught in the rollers by the rotation thereof, are torn by protrusions notched on the surface of the rollers, curled by trenches diagonally made in the rollers, and then shaped into granules. Examples of such a CTC processing apparatus include CTC machine invented by W. McKercher in 1930 (Ko-cha no sekai, written by Yasumasa Araki, published by Shibata Shoten, 2001; Ryokucha no Jiten, written by Minoru Takano, Yozo Tanimoto, Isamu Tomita, Kiyoshi Iwaasa, Muneyuki Nakagawa, Yasuhide Teramoto, and Shinnichi Yamada, edited by Nippon Chagyo Chuo-kai, published by Shibata Shoten, 2002; Nihoncha Instructor Koza I, produced and edited by NPO Nihoncha Instructor Association, published by NPO Nihoncha Instructor Association, 2004). This CTC processing is usually not employed for the processing of green tea. This CTC processing increases the extraction efficiency of non-polymer catechins and at the same time reduces bitterness and astringency.

The tea leaves subjected to CTC processing are then dried to reduce their water content to 20 wt. % or less. This drying step improves the extraction efficiency of non-polymer catechins. No limitation is imposed on the drying conditions insofar as the water content becomes 20 mass % or less. They may differ, depending on the water content of raw material tea leaves. For example, when steamed tea leaves are used as raw materials, they are dried preferably at from 50 to 200° C. for from 10 minutes to 1 hour. The water content of the tea leaves after drying is preferably from 2 to 20 mass %, more preferably from 2 to 15 mass %, still more preferably from 2 to 8 mass %. A drier employed for this drying is preferably a belt conveyor dryer.

The dried tea leaves thus obtained are then extracted while setting a mass ratio (extraction ratio) of an extraction solvent to the tea leaves to be extracted at 30 or less. Mass ratios of the extraction solvent exceeding 30 are not preferred because they increase a gallate percentage in non-polymer catechins and increase both bitterness and astringency. The mass ratio is preferably from 5 to 30, more preferably from 5 to 25, even more preferably from 5 to 20.

Examples of the extraction solvent include water and an aqueous ethanol solution. Of these, water is preferred. Extraction is preferably performed using warm water or hot water. The temperature at the time of extraction from tea leaves is preferably from 60 to 100° C., more preferably from 65 to 100° C. from the standpoints of heightening the extraction efficiency of non-polymer catechins and providing good taste. The extraction time from tea leaves is preferably from 1 to 60 minutes, more preferably from 1 to 30 minutes, still more preferably from 1 to 10 minutes. Extraction time below the above-described range leads to insufficient elution of non-polymer catechins, while extraction time exceeding the above-described range inevitably accelerates the thermal denaturation and isomerization reaction. To water to be used as an extraction solvent, an organic acid or organic acid salt such as sodium ascorbate may be added in advance. A process of extracting in a so-called non-oxidizing atmosphere while removing dissolved oxygen by boiling for deaeration or feeding of an inert gas such as nitrogen gas may be used in combination.

As an extraction means, either column extraction or kneader extraction may be employed, but column extraction is more preferred.

The non-polymer catechin concentration in the solid content of the green tea extract thus obtained is preferably from 24 to 40 mass %, more preferably from 26 to 40 mass %, especially preferably from 28 to 40 mass %.

The content of gallate esters (gallate percentage) in the non-polymer catechins of the green tea extract thus obtained is preferably from 40 to 62 mass %, more preferably from 45 to 60 mass %, even more preferably from 45 to 55 mass % from the standpoint of reducing the bitterness and astringency. The term "non-gallate" as used herein means catechin, gallocatechin, epicatechin or epigallocatechin, while the term "gallate" means catechin gallate, gallocatechin gallate, epicatechin gallate or epigallocatechin gallate.

The green tea extract thus obtained has a high concentration of non-polymer catechins and has reduced bitterness and astringency so that it can be used for a packaged beverage as is or after ordinary dilution.

EXAMPLES

Measurement of Non-Polymer Catechins

A beverage is filtered through a filter (0.8 µm) and the non-polymer catechin content in it is measured by high-performance liquid chromatograph ("SCL-10AVP", product of Shimadzu Corporation) equipped with "L-Column TM ODS", packed column for octadecyl-introduced liquid chromatograph, (4.6 mmØ×250 mm: product of Chemicals Evaluation and Research Institute, Japan) at a column temperature of 35° C. by a gradient method. Measurement is conducted under the following conditions: use of a distilled-water solution containing 0.1 mol/L of acetic acid as a mobile phase solution A and an acetonitrile solution containing 0.1 mol/L of acetic acid as a mobile phase solution B, an injection amount of a sample: 10 µL, and a wavelength of UV detector at 280 nm.

Column Extraction

A tea extract was prepared using an extracting apparatus as illustrated in FIG. 1. Water for extraction was fed through a pump 1 to a heat exchanger for heating ion exchange water and after heating, it was supplied upward from the lower part of a closed extraction column 3. Tea leaves 4 were charged between a tea-leaves retainer plate (below) 6 and a tea-leaves retainer plate (upper) in an extraction column. An extract was collected in an extract recovery tank 8 via an exchanger for cooling the extract 7.

Kneader Extraction

Tea leaves were charged in heated ion exchange water. The mixture was stirred for 5 minutes at 150 rpm, followed by suction filtration and then ice cooling.

Catechin Extraction Ratio

Assuming that the total amount of non-polymer catechins contained in tea leaves was 100%, the amount of non-polymer catechins extracted under each condition was calculated and it was designated as a catechin extraction ratio.

Non-Gallate Extraction Ratio/Gallate Extraction Ratio

Assuming that the amount of non-polymer catechins of the non-gallates contained in the tea leaves was 100%, the amount of non-polymer catechins of the non-gallates extracted under each condition was calculated and it was designated as a non-gallate extraction ratio. Similarly, the amount of non-polymer catechins of the gallates was calculated and designated as a gallate extraction ratio. A non-gallate extraction ratio/gallate extraction ratio was determined by dividing the non-gallate extraction ratio by the gallate extraction ratio. When this value is high, the extract has reduced bitterness and astringency.

Example 1

Green tea leaves of *Camellia sinensis* were used and the enzyme contained in them was inactivated by steaming at 94°

C. for 1.5 minutes. The enzyme-inactivated tea leaves were subjected to CTC processing (rotation speeds: 90 rpm and 900 rpm, continuous processing with six machines), then dried on a belt conveyor drier untiul the water content of the tea leaves became 5 wt % or less, followed by column extraction (extraction ratio: 10, extraction temperature: 70° C., extraction time: 2.4 minutes).

The resulting extract had, in the solid content thereof, a non-polymer catechin concentration of 33 wt. %, while the content of gallate esters contained in the non-polymer catechins (which will hereinafter be called "gallate content") was 48 wt. %. The catechin extraction ratio was 61%, and non-gallate extraction ratio/gallate extraction ratio was 1.43.

Example 2

In a similar manner to Example 1 except that the extraction temperature was raised to 90° C., an extract was obtained. The resulting extract had, in the solid content thereof, a non-polymer catechin concentration of 34 wt. %, while a gallate content was 50 wt. %. The catechin extraction ratio was 65%, and non-gallate extraction ratio/gallate extraction ratio was 1.30.

Example 3

In a similar manner to Example 1 except that the extraction ratio was raised to 20 and extraction time was increased to 4.8 minutes, an extract was obtained. The resulting extract had, in the solid content thereof, a non-polymer catechin concentration of 33 wt. %, while a gallate content was 51 wt. %. The catechin extraction ratio was 87%, and non-gallate extraction ratio/gallate extraction ratio was 1.26.

Example 4

In a similar manner to Example 3 except that the extraction temperature was raised to 80° C., an extract was obtained. The resulting extract had, in the solid content thereof, a non-polymer catechin concentration of 33 wt. %, while a gallate content was 52 wt. %. The catechin extraction ratio was 88%, and non-gallate extraction ratio/gallate extraction ratio was 1.22.

Example 5

In a similar manner to Example 1 except that the extraction ratio was raised to 30 and extraction time was increased to 7.2 minutes, an extract was obtained. The resulting extract had, in the solid content thereof, a non-polymer catechin concentration of 33 wt. %, while a gallate content was 53 wt. %. The catechin extraction ratio was 95%, and non-gallate extraction ratio/gallate extraction ratio was 1.16.

Example 6

Green tea leaves of *Camellia sinensis* were used and the enzyme contained therein was inactivated by steaming at 94° C. for 1.5 minutes. The resulting tea leaves were subjected to CTC processing (rotation speeds: 90 rpm and 900 rpm, continuous processing using six machines), then dried on a belt conveyor drier until the water content of the tea leaves became 5 wt. % or less, followed by kneader extraction (extraction ratio: 25, extraction temperature: 70° C., extraction time: 5 minutes).

The resulting extract had, in the solid content thereof, a non-polymer catechin concentration of 30 wt. %, while a gallate content was 51 wt. %. The catechin extraction ratio was 70%, and non-gallate extraction ratio/gallate extraction ratio was 1.29.

Example 7

In a similar manner to Example 6 except that the extraction temperature was raised to 85° C., an extract was obtained. The resulting extract had, in the solid content thereof, a non-polymer catechin concentration of 31 wt. %, while a gallate content was 53%. The catechin extraction ratio was 75%, and non-gallate extraction ratio/gallate extraction ratio was 1.19.

Example 8

In a similar manner to Example 3 except that extraction time was reduced to 2.4 minutes and tea leaves having a different composition were employed, an extract was obtained. The resulting extract had, in the solid content thereof, a non-polymer catechin concentration of 31 wt. %, while a gallate content was 55.8 wt. %. The catechin extraction ratio was 60.2%, and non-gallate extraction ratio/gallate extraction ratio was 1.48.

Example 9

In a similar manner to Example 8 except that the extraction temperature was raised to 75° C., an extract was obtained. The resulting extract had, in the solid content thereof, a non-polymer catechin concentration of 31 wt. %, while a gallate content was 56.8 wt. %. The catechin extraction ratio was 65.2%, and non-gallate extraction ratio/gallate extraction ratio was 1.42.

Example 10

In a similar manner to Example 8 except that the extraction ratio was raised to 30 and extraction time was increased to 3.6 minutes, an extract was obtained. The resulting extract had, in the solid content thereof, a non-polymer catechin concentration of 33 wt. %, while a gallate content was 57.8 wt. %. The catechin extraction ratio was 74.7%, and non-gallate extraction ratio/gallate extraction ratio was 1.36.

Example 11

In a similar manner to Example 9 except that the extraction ratio was raised to 30 and extraction time was increased to 3.6 minutes, an extract was obtained. The resulting extract had, in the solid content thereof, a non-polymer catechin concentration of 33 wt. %, while a gallate content was 59.0 wt. %. The catechin extraction ratio was 77.7%, and non-gallate extraction ratio/gallate extraction ratio was 1.29.

Example 12

In a similar manner to Example 6 except that tea leaves having a different composition were employed, an extract was obtained. The resulting extract had, in the solid content thereof, a non-polymer catechin concentration of 31 wt. %, while a gallate content was 58.2 wt. %. The catechin extraction ratio was 65.7%, and non-gallate extraction ratio/gallate extraction ratio was 1.34.

Example 13

In a similar manner to Example 12 except that the extraction temperature was raised to 85° C., an extract was obtained.

The resulting extract had, in the solid content thereof, a non-polymer catechin concentration of 33 wt. %, while a gallate content was 61.1 wt. %. The catechin extraction ratio was 71.0%, and non-gallate extraction ratio/gallate extraction ratio was 1.19.

Comparative Example 1

Sen-cha manufactured in 2002 was purchased and used as green tea leaves. The green tea leaves were subjected to column extraction (extraction ratio: 10, extraction temperature: 70° C., extraction time: 2.4 minutes) to yield an extract.

The resulting extract had, in the solid content thereof, a non-polymer catechin concentration of 33 wt. %. The catechin extraction ratio was 23%, and non-gallate extraction ratio/gallate extraction ratio was 1.25.

Comparative Example 2

In a similar manner to Comparative Example 1 except that the extraction ratio was raised to 20 and extraction time was increased to 4.8 minutes, an extract was obtained. The resulting extract had, in the solid content thereof, a non-polymer catechin concentration of 32 wt. %. The catechin extraction ratio was 40%, and non-gallate extraction ratio/gallate extraction ratio was 1.18.

Comparative Example 3

In a similar manner to Comparative Example 1 except that the extraction ratio was raised to 30 and extraction time was increased to 7.2 minutes, an extract was obtained. The resulting extract had, in the solid content thereof, a non-polymer catechin concentration of 33 wt. %. The catechin extraction ratio was 60%, and non-gallate extraction ratio/gallate extraction ratio was 1.14.

Comparative Example 4

Sen-cha manufactured in 2002 was purchased and used as green tea leaves. The green tea leaves were subjected to kneader extraction (extraction ratio: 25, extraction temperature: 70° C., extraction time: 5 minutes).

The resulting extract had, in the solid content thereof, a non-polymer catechin concentration of 30 wt. %. The catechin extraction ratio was 64%, and non-gallate extraction ratio/gallate extraction ratio was 1.08.

Comparative Example 5

In a similar manner to Example 2 except that the extraction ratio and extraction time were increased to 40 and 9.6 minutes, respectively, an extract was obtained. The resulting extract had, in the solid content thereof, a non-polymer catechin concentration of 33 wt. %. The catechin extraction ratio was 100%, and non-gallate extraction ratio/gallate extraction ratio was 1.00.

Comparative Example 6

In a similar manner to Example 6 except that the extraction ratio and extraction temperature were increased to 40 and 100° C., respectively, an extract was obtained. The resulting extract had, in the solid content thereof, a non-polymer catechin concentration of 28 mass %. The catechin extraction ratio was 65%, and non-gallate extraction ratio/gallate extraction ratio was 1.04.

Comparative Example 7

In a similar manner to Example 6 except that the extraction ratio was raised to 100 and extraction temperature was decreased to 40° C., an extract was obtained. The resulting extract had, in the solid content thereof, a non-polymer catechin concentration of 22 mass %. The catechin extraction ratio was 33%, and non-gallate extraction ratio/gallate extraction ratio was 2.09.

The results are shown in Table 1. The green tea extract obtained by CTC processing enzyme-inactivated green tea leaves and then drying and extracting said tea leaves at an extraction ratio of 30 or less, was high in extraction ratio of non-polymer catechins and at the same time, high in non-gallate extraction ratio/gallate extraction ratio. This suggests that such processing is effective for reducing bitterness and astringency. The green tea extracts obtained in Comparative Examples 1 to 4 without CTC processing and that obtained in Comparative Example 7 by extracting at an extraction temperature of 40° C. and extraction ratio of 100 without omitting CTC processing were low in catechin extraction efficiency or low in gallate extraction ratio/gallate extraction ratio. This suggests that such processing has an insufficient effect for reducing bitterness and astringency. The green tea extracts obtained in Comparative Examples 5 and 6 by extracting at an extraction ratio of 30 or greater without omitting CTC processing was high in catechin extraction ratio but low in no-gallate extraction ratio/gallate extraction ratio. This suggests that such processing has an insufficient effect for reducing bitterness and astringency.

TABLE 1

|  | Examples | | | | | | | Comparative Examples | | | | | | |
| --- | --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 | 7 |
| Processing before extraction | CTC | CTC | CTC | CTC | CTC | CTC | CTC | Rolling | Rolling | Rolling | Rolling | CTC | CTC | CTC |
| Extraction method | Column | Column | Column | Column | Column | Kneader | Kneader | Column | Column | Column | Kneader | Column | Kneader | Kneader |
| Extraction ratio | 10 | 10 | 20 | 20 | 30 | 25 | 25 | 10 | 20 | 30 | 25 | 40 | 40 | 100 |
| Extraction Tmp. (° C.) | 70 | 90 | 70 | 80 | 70 | 70 | 85 | 70 | 70 | 70 | 70 | 90 | 100 | 40 |
| Extraction time (min) | 2.4 | 2.4 | 4.8 | 4.8 | 7.2 | 5 | 5 | 2.4 | 4.8 | 7.2 | 5 | 9.6 | 5 | 5 |
| Catechin extraction ratio (%) | 61 | 65 | 87 | 88 | 95 | 70 | 75 | 23 | 45 | 60 | 64 | 100 | 65 | 33 |
| Non-gallate extraction ratio/gallate extraction ratio | 1.43 | 1.30 | 1.26 | 1.22 | 1.16 | 1.29 | 1.19 | 1.25 | 1.18 | 1.14 | 1.08 | 1.00 | 1.04 | 2.09 |

TABLE 1-continued

| | Examples | | | | | |
|---|---|---|---|---|---|---|
| | 8 | 9 | 10 | 11 | 12 | 13 |
| Processing before extraction | CTC | CTC | CTC | CTC | CTC | CTC |
| Extraction method | Column | Column | Column | Column | Kneader | Kneader |
| Extraction ratio | 20 | 20 | 30 | 30 | 25 | 25 |
| Extraction Tmp. (° C.) | 70 | 75 | 70 | 75 | 70 | 85 |
| Extraction time (min) | 2.4 | 2.4 | 3.6 | 3.6 | 5 | 5 |
| Catechin extraction ratio (%) | 60.2 | 65.2 | 74.7 | 77.7 | 65.7 | 71.0 |
| Non-gallate extraction ratio/ gallate extraction ratio | 1.48 | 1.42 | 1.36 | 1.29 | 1.34 | 1.19 |

\* Gallate ratio of the tea leaves used in Examples 1 to 7 and Comparative Examples 5 to 7: 57%
\* Gallate ratio of the tea leaves used in Examples 8 to 13: 65%
\* Gallate ratio of the tea leaves used in Comparative Examples 1 to 4: 69%

The invention claimed is:

1. A preparation process of a green tea extract, said process comprising subjecting enzyme-inactivated raw tea leaves to crushing-tearing-curling processing, drying the processed tea leaves until a water content thereof becomes 2 to 15 wt. %, and then extracting the dried tea leaves while setting the weight ratio of an extraction solvent to the tea leaves to be extracted to 5 to 30.

2. The preparation process according to claim 1, wherein the green tea extract has, in the solid content thereof, a non-polymer catechin concentration of from 20 to 40 wt. % and catechin gallates constitute from 40 to 62 wt. % of the non-polymer catechins.

3. The preparation process according to claim 1 or 2, wherein the enzyme inactivation treatment is selected from the group consisting of a steaming treatment, dipping in hot water and a pan firing treatment.

4. The preparation process according claim 1 or 2, wherein the extraction is performed with water of from 60 to 100° C.

5. The preparation process according to claim 1, wherein the extraction solvent is water or an aqueous ethanol solution.

6. The preparation process according to claim 1, wherein the processed tea leaves are dried until the water content thereof becomes 2 to 8 wt %.

7. The preparation process according to claim 1, wherein the weight ratio of the extraction solvent to the tea leaves to be extracted is 5 to 20.

8. The preparation process according to claim 2, wherein the non-polymer catechin concentration is from 28 to 40 wt % and the catechin gallates constitute from 45 to 55 wt % of the non-polymer catechins.

* * * * *